(12) United States Patent
Martinez

(10) Patent No.: US 10,569,751 B2
(45) Date of Patent: Feb. 25, 2020

(54) METHOD FOR CONTROLLING THE LATERAL PULLING OF A MOTOR VEHICLE DURING BRAKING

(71) Applicant: Renault s.a.s., Boulogne-Billancourt (FR)

(72) Inventor: Didier Martinez, Saint-Etienne-sous-Bailleul (FR)

(73) Assignee: Renault s.a.s., Boulogne-Billancourt (FR)

(*) Notice: Subject to any disclaimer, the term of this patent is extended or adjusted under 35 U.S.C. 154(b) by 170 days.

(21) Appl. No.: 15/515,939

(22) PCT Filed: Sep. 29, 2015

(86) PCT No.: PCT/FR2015/052603
§ 371 (c)(1),
(2) Date: Apr. 19, 2017

(87) PCT Pub. No.: WO2016/055716
PCT Pub. Date: Apr. 14, 2016

(65) Prior Publication Data
US 2017/0247022 A1    Aug. 31, 2017

(30) Foreign Application Priority Data

Oct. 9, 2014 (FR) ..................... 14 59694

(51) Int. Cl.
*B60T 8/172* (2006.01)
*B60T 8/1755* (2006.01)
(Continued)

(52) U.S. Cl.
CPC .............. *B60T 8/1755* (2013.01); *B60T 7/12* (2013.01); *B60T 8/172* (2013.01); *B60T 8/76* (2013.01)

(58) Field of Classification Search
None
See application file for complete search history.

(56) References Cited

U.S. PATENT DOCUMENTS 5,407,259 A   4/1995  Itabashi et al.
8,831,853 B1  9/2014  Barrowman et al.

FOREIGN PATENT DOCUMENTS

JP    6-144188 A    5/1994
JP    8-53060 A     2/1996

OTHER PUBLICATIONS

International Search Report dated Dec. 22, 2015 in PCT/FR2015/052603 filed Sep. 29, 2015.
(Continued)

*Primary Examiner* — Abdhesh K Jha
(74) *Attorney, Agent, or Firm* — Oblon, McClelland, Maier & Neustadt, L.L.P.

(57) ABSTRACT

A method controls lateral pulling of a moving motor vehicle during braking. The method includes a) calculating a value representative of a difference between angular accelerations of left and right wheels of a wheelset of the motor vehicle, b) calculating a correction value as a function of at least the value representative of the difference between the angular accelerations; and c) controlling for the left wheel and the right wheel an associated brake so as to modify a drag force applied by the associated brake as a function of the correction value calculated in step b), such that the drag force applied to a first wheel of the left and right wheels is increased, and the drag force applied to a second wheel different from the first wheel is reduced, to reduce the value representative of the difference between the angular accelerations of the left and right wheels.

11 Claims, 1 Drawing Sheet

(51) Int. Cl.
*B60T 7/12* (2006.01)
*B60T 8/76* (2006.01)

(56) References Cited

OTHER PUBLICATIONS

French Search Report dated Apr. 23, 2015 in FR 1459694 filed Oct. 9, 2014.

METHOD FOR CONTROLLING THE LATERAL PULLING OF A MOTOR VEHICLE DURING BRAKING

BACKGROUND

The invention concerns a method for controlling the lateral pulling of a moving motor vehicle during braking of the motor vehicle.

When a driver of a motor vehicle generates a braking instruction, a drag force is applied to each wheel of the vehicle via a brake.

It is relatively important that the moments produced by the drag forces are balanced for each wheelset of the motor vehicle, in order for the braking to be rectilinear.

However, frequently for a given wheelset, the drag forces applied to each wheel have a degree of dissymmetry. Such a dissymmetry creates a difference in the moments produced by each wheel of the wheelset on the motor vehicle, which may lead to a lateral pulling effect, or in other words a lateral acceleration leading to a yawing of the motor vehicle.

Small motor vehicles, in particular those with short wheelbases, are particularly susceptible to yawing during braking.

It is therefore relatively important to control the pulling during braking of a wheelset of a motor vehicle.

It is known for example to use motor vehicle status sensors to measure the yaw of the motor vehicle, and to counter this yaw effect by acting on the drag forces of each wheel of the motor vehicle.

However, such a solution is relatively slow and the correction may be perceived by the driver of the vehicle, which generally has a disturbing effect for the steering, for example a sensation of loss of control.

There is therefore a need for a faster method of controlling the lateral pulling during braking.

BRIEF SUMMARY

To this end, the object of the invention concerns a method for controlling the lateral pulling of a moving motor vehicle during braking of the motor vehicle, the motor vehicle comprising at least one wheelset; the wheelset comprising a left wheel and a right wheel; each wheel of the wheelset defining an angular speed and an angular acceleration;

each wheel of the wheelset cooperating with a braking means, for example a hydraulic disc brake or a drum brake or any other type of brake, such that the braking means applies a drag force to the associated wheel so as to reduce the angular speed of the associated wheel;

characterized in that it comprises the following steps:

a) calculating a value representative of the difference between the angular accelerations of the left and right wheels of the wheelset;

b) calculating a correction value as a function of at least the value representative of the difference between the angular accelerations of the left and right wheels of the wheelset;

c) for each wheel of the wheelset, controlling the associated braking means so as to modify the drag force applied by the associated braking means as a function of the correction value calculated in step b), such that the drag force applied to a first wheel selected from the left wheel and right wheel of the wheelset is increased, and the drag force applied to a second wheel different from the first wheel is reduced, in order to reduce the value representative of the difference between the angular accelerations of the left and right wheels of the wheelset.

Thus a relatively rapid control method may be obtained which allows correction of the lateral pulling of the vehicle before the driver perceives this.

In particular, the correction value may be the estimated difference between the angular decelerations of the wheels amplified by a correction gain.

Advantageously and without limitation, steps a) to c) may be repeated until the value representative of the difference between the angular accelerations of the left and right wheels of the wheelset, calculated during step a), is zero. The value representative of the difference between the angular accelerations may also be relatively close to zero.

Since the correction is active continuously from the start of braking, the value representative of the difference will naturally tend towards a zero value.

In particular, the value representative of the difference is directly connected to the sensitivity of the correction system, either on the actuator side or on the sensor side.

In this way, the value representative of the difference between the angular accelerations may rapidly converge towards a value close to zero, and the lateral pulling may thus be corrected relatively effectively.

Advantageously and without limitation, during step a):

for each left and right wheel of the wheelset, an angular acceleration value of the wheel may be received, for example via a sensor for the angular acceleration of the wheel, by a high-pass filter or a splitter filter applied to the angular speed of the wheel, or by any other means for assessing the angular acceleration;

the difference between the angular acceleration values calculated for the left wheel and right wheel may be calculated.

Thus the difference between the angular accelerations of the left and right wheels of the wheelset may be obtained relatively rapidly.

According to a preferred embodiment and without limitation, during step a):

for each left and right wheel of the wheelset, an angular speed value of the wheel may be received, for example via an angular speed sensor associated with the wheel;

a value for the difference between the received angular speed values may be calculated;

a derivative value of the difference between the angular speed values may be estimated by a high-pass filter, a splitter filter or any other derivative calculation means, said derivative value corresponding to the value representative of the difference between the angular accelerations of the left and right wheels of the wheelset.

Advantageously and without limitation, the correction value may be proportional to the value representative of the difference between the angular accelerations of the left and right wheels of the wheelset. The correction value may thus be obtained by multiplication of a gain, for example constant, for example comprising at least the value ½, by the value of the difference between the angular accelerations of the left and right wheels of the wheelset.

Advantageously and without limitation, the control method may be applied to a front wheelset of a motor vehicle. Thus the corrected braking may be relatively reliable.

The invention also relates to a device for controlling the lateral pulling of a moving motor vehicle during braking of the motor vehicle, the motor vehicle comprising at least one wheelset; the wheelset comprising a left wheel and a right wheel; each wheel of the wheelset defining an angular speed and an angular acceleration;

each wheel of the wheelset cooperating with a braking means such that the braking means applies a drag force to the associated wheel so as to reduce the angular speed of said associated wheel;

characterized in that it comprises:

calculating means able to calculate a value representative of the difference between the angular accelerations of the left and right wheels of the wheelset;

the calculating means also being able to calculate a correction value as a function of at least said value representative of the difference between the angular accelerations of the left and right wheels of the wheelset;

control means to control, for each wheel of the wheelset, the associated braking means so as to modify the drag force applied by the associated braking means as a function of the correction value calculated by the calculating means, such that the drag force applied to a first wheel selected from the left wheel and right wheel of the wheelset is increased, and the drag force applied to a second wheel different from the first wheel is reduced, in order to reduce the value representative of the difference between the angular accelerations of the left and right wheels of said wheelset.

The invention also relates to a motor vehicle comprising a control device as described above.

BRIEF DESCRIPTION OF THE DRAWINGS

The invention will now be described with reference to the attached drawings which are not limitative and in which.

DETAILED DESCRIPTION

In the present description, the terms "front", "rear", "upper" and "lower" refer to the forward and back directions of the vehicle. The axes X, Y and Z correspond respectively to the longitudinal axis (from front to back), the transverse axis and the vertical axis of the vehicle.

The terms "substantially horizontal", "substantially longitudinal" or "substantially vertical" mean a direction/plane forming an angle of most ±20°, or at most 10° or at most 5° with a horizontal, longitudinal or vertical direction/plane.

The terms "substantially parallel", "substantially perpendicular" or "substantially right-angled" mean a direction/angle deviating at most by ±20°, or at most by 10° or at most by 5° from a parallel or perpendicular direction or a right angle.

Figure 1:
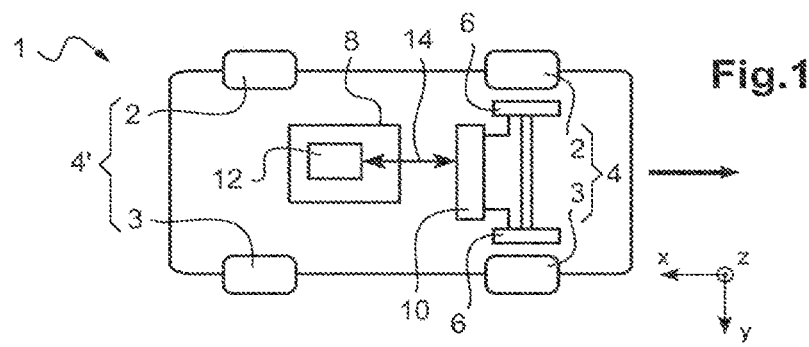
FIG. 1 is a diagrammatic view of a motor vehicle according to one embodiment of the invention.

With reference to FIG. 1, a motor vehicle 1 comprises a front wheelset 4 and a rear wheelset 4'. Each wheelset 4, 4' comprises a left wheel 2 and a right wheel 3.

Each wheel 2, 3 of the motor vehicle cooperates with a braking means 6, here a hydraulically actuated disc brake 6.

When the vehicle is in motion, each wheel 2, 3 defines an angular speed v2, v3 and an angular acceleration a2, a3.

Figure 2:
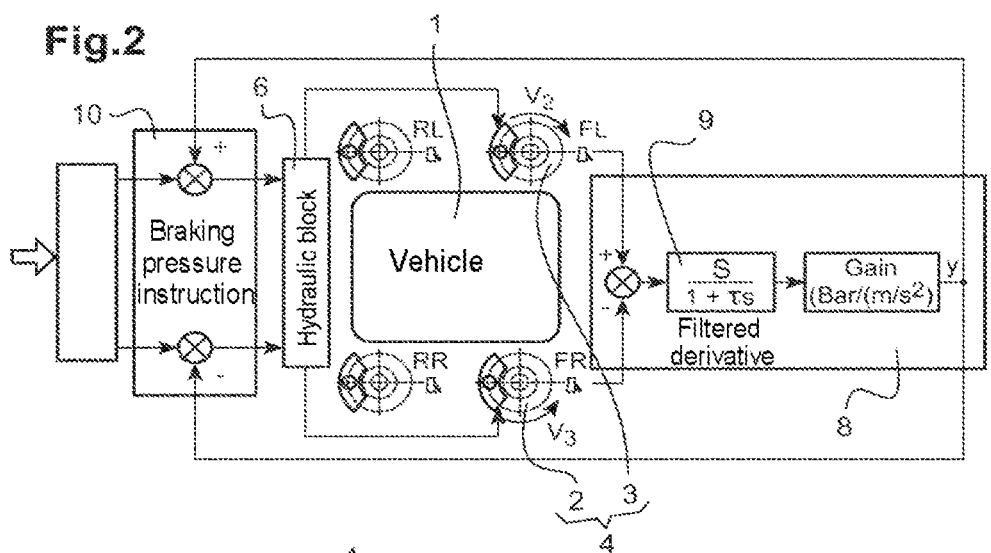
FIG. 2 is a summary diagram of the progress of the control method according to a first embodiment of the invention.

With reference to FIG. 2, in order to brake, a driver actuates the brake pedal of the motor vehicle (not shown). A braking instruction is then sent to a braking control device 10.

The braking control device 10 then calculates, for each wheel 2, 3, a value for the drag force, here expressed in Nm, to be applied.

This calculated drag force value is then sent to the braking means 6 of each wheel 2, 3, which then applies the corresponding drag force to the associated wheel 2, 3.

A device 8 for controlling the lateral pulling of the motor vehicle 1 then receives an angular speed value v2, v3 for each wheel 2, 3 of the front wheelset 4.

In the present description, the pulling control method as implemented by the lateral pulling control device 8 is only applied to the front wheelset 4. In fact during braking of the motor vehicle 1, approximately 80% of the braking is applied to the front wheelset 4. However, the method may also be applied to the rear wheelset 4', and may be implemented for both wheelsets 4, 4' simultaneously.

The lateral pulling control device 8 comprises calculating means 12, here a microprocessor 12, which receives the angular speed values v2, v3, for example in rad/s or in degrees/s, from the left 2 and right 3 wheels respectively of the front wheelset 4.

With reference to FIG. 2, the calculating means 12 then calculate a value ε of the difference between the angular speed values v2 and v3 received. This difference value s may be obtained using the equation:

$$\varepsilon = v2 - v3$$

It is evident to the person skilled in the art that a difference in angular speed can easily be correlated with an approximation of a difference in longitudinal speed, by correcting this difference value by the parameters of wheels 2, 3, for example as a function of the radius value of the wheels 2, 3, such that E can be considered to be equivalent to a value expressed in m/s, by means of a conversion gain.

The calculating means 12 then estimates a derivative value of the difference value ε.

This derivative value dε/dt may be obtained by application of a high-pass filter 9.

In other words, to estimate the derivative value of the difference value ε, by passing into the frequency field, the following high-pass filter 9 is applied:

$$s/(1+\tau S)$$

in which:

τ is the time constant of the circuit;

s is the Laplace variable.

The cut-off frequency of the high-pass filter (1/τ) is adjusted such that the filtered derivative lies in a frequency field compatible with the desired pass band for the efficacy of the correction filter, which is well known to the person skilled in the art.

The derived action is determined from 0 to the median value of the cut-off frequency.

In the case of a braking system, the pass band of the latter is of the order of 10 Hz. The cut-off frequency of the high-pass filter is of the order of 20 Hz or more.

More generally, the use of such a high-pass filter 9 or splitter filter 9 is well known to the person skilled in the art.

The calculating means 12 then obtains as a result a derived value of the difference value c. This derived value corresponds to the value representative of the difference between the angular accelerations of the right and left wheels of the wheelset.

Figure 3:
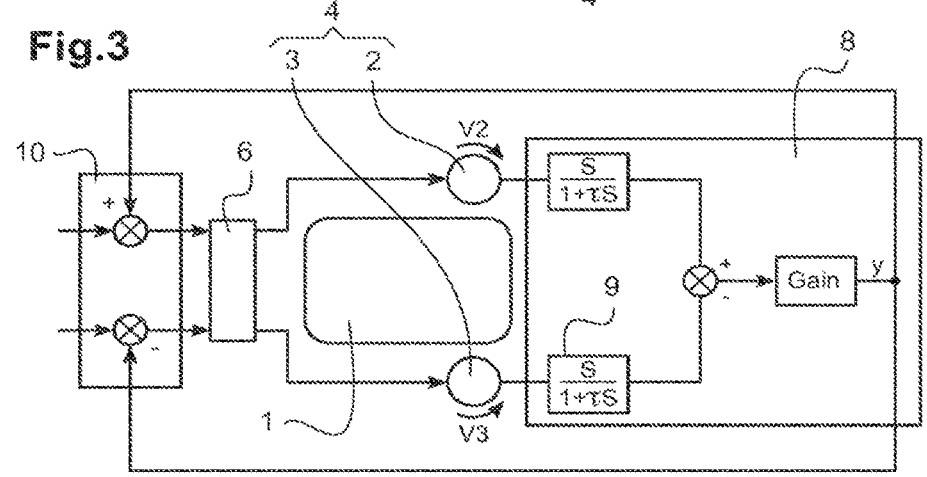
FIG. 3 is a summary diagram of the progress of the control method according to a second embodiment of the invention.

In an alternative embodiment, shown in FIG. 3, the calculating means 12 may receive the angular speed values v2, v3 of the wheels 2, 3 of the front wheelset, then for each wheel 2,3 of the wheelset 4, estimate the derived values of the angular speed values v2, v3 so as to obtain, for each wheel, the angular acceleration a2, a3 of each wheel 2, 3.

The derived values may also be obtained by application of a high-pass filter 9 for each angular speed value v2, v3 of each wheel 2, 3, as described above.

The derived values may also be sent directly by an angular acceleration sensor installed on each wheel 2, 3 of the front wheelset.

Then the calculating means 12 calculates the difference a2-a3 between the angular acceleration values of wheels 2, 3 of the front wheelset 4. This difference corresponds to the value representative of the difference between the angular accelerations of the right 2 and left 3 wheels of the wheelset 4.

With reference to FIGS. 1, 2 and 3, the calculating means 12 of the lateral pulling control device 8 calculates a correction value y. The correction value y is obtained for each wheel 2, 3 by multiplication of a gain value G by the value representative of the difference between the angular accelerations of the left 2 and right 3 wheels of the wheelset 4, the correction value y being considered as equivalent to a value expressed in bar/(m/s$^2$).

As a first approximation, the gain value G is equal to ½. But it must also contain control parameters well-known to the person skilled in the art.

The correction value y is then transmitted by control means 14, here a communication bus 14, to the braking control device 10 in order to control the application of the correction value y to the braking means 6 of each wheel 2, 3 of the front wheelset 4.

The correction value y is then sent as positive +y to the braking control device 10 for the left wheel 2, and as negative −y for the right wheel 3. This correction value +y, −y is then added to the drag forces to be applied to each wheel 2, 3 in order to correct the difference in annular acceleration between the left 2 and right 3 wheels of the front wheelset 4.

The correction value y may also, in an alternative, only be sent once to the braking control device which itself adds the positive correction value +y to the drag force to be applied to the left wheel 2, and the negative value −y to the drag force to be applied to the right wheel 3.

A correction value is calculated as long as the driver applies a braking instruction, and as long as the value representative of the difference between the angular accelerations of the left 2 and right 3 wheels of the wheelset 4 is not zero.

In other words, the method described is repeated by the lateral pulling control device 8 as long as the difference in angular acceleration between the left 2 and right 3 wheels of the front wheelset 4 is not zero or is not negligible. For example, a threshold for stopping the lateral pulling control method could be defined, for example substantially close to zero, for example less than 2% of the mean value of the drag forces applied to the wheels 2, 3 of the front wheelset 4.

The invention claimed is:

1. A method for controlling lateral pulling of a moving motor vehicle during braking of said motor vehicle, said motor vehicle comprising at least one wheelset; said wheelset comprising a left wheel and a right wheel; the left wheel and the right wheel each defining an angular speed and an angular acceleration; the left wheel and the right wheel each cooperating with a brake such that said brake applies a drag force to the associated wheel so as to reduce the angular speed of said associated wheel; the method comprising:

a) calculating a value representative of a difference between the angular accelerations of the left and right wheels of the wheelset;
b) calculating a correction value by multiplying a gain by said value representative of the difference between the angular accelerations of the left and right wheels of the wheelset such that the correction value is proportional to the value representative of the difference between the angular accelerations of the left and right wheels of the wheelset; and
c) controlling for the left wheel and the right wheel the associated brake so as to modify the drag force applied by the associated brake as a function of the correction value calculated in step b), such that the drag force applied to a first wheel selected from the left wheel and right wheel of the wheelset is increased, and the drag force applied to a second wheel different from the first wheel is reduced, in order to reduce said value representative of the difference between the angular accelerations of the left and right wheels of said wheelset.

2. The control method as claimed in claim 1, wherein steps a) to c) are repeated until the value representative of the difference between the angular accelerations of the left and right wheels of the wheelset, calculated during step a), is zero.

3. The control method as claimed in claim 1, wherein during step a):

for each of the left and right wheel of the wheelset, the angular acceleration value of said wheel is received; and a difference between the angular acceleration values calculated for the left wheel and right wheel is calculated.

4. The control method as claimed in claim 1, wherein during step a):

for each of the left and right wheel of the wheelset, the angular speed value of said wheel is received;

a value for a difference between the received angular speed values is calculated; and a derivative value for the difference between the angular speed values is estimated, said derivative value corresponding to the value representative of the difference between the angular accelerations of the left and right wheels of the wheelset.

5. The control method as claimed in claim 1, wherein the wheelset is a front wheelset of the motor vehicle.

6. A device for controlling lateral pulling of a moving motor vehicle during braking of said motor vehicle, said motor vehicle comprising at least one wheelset; said wheelset comprising a left wheel and a right wheel; the left wheel and the right wheel each defining an angular speed and an angular acceleration; the left wheel and the right wheel each cooperating with a brake such that said brake applies a drag force to the associated wheel so as to reduce the angular speed of said associated wheel; the device comprising:

a microprocessor configured to calculate a value representative of the difference between the angular accelerations of the left and right wheels of the wheelset, the microprocessor also being able to calculate a correction value by multiplying a gain by said value representative of the difference between the angular accelerations of the left and right wheels of the wheelset such that the correction value is proportional to the value representative of the difference between the angular accelerations of the left and right wheels of the wheelset, wherein, for the left wheel and the right wheel, the device controls the associated brake so as to modify the drag force applied by said associated brake as a function of the correction value calculated by the microprocessor, such that the drag force applied to a first wheel selected from the left wheel and right wheel of the wheelset is increased, and the drag force applied to a second wheel different from the first wheel is reduced, in order to reduce said value representative of the difference between the angular accelerations of the left and right wheels of said wheelset.

7. A motor vehicle comprising:
the control device as claimed in claim 6.

8. The control method as claimed in claim 1, wherein the gain is 0.5.

9. The control method as claimed in claim 1, wherein the brake includes a hydraulic disc brake or a drum brake.

10. The device as claimed in claim 6, wherein the gain is 0.5.

11. The device as claimed in claim 6, wherein the brake includes a hydraulic disc brake or a drum brake.

\* \* \* \* \*